US008648844B2

(12) United States Patent
Mertens

(10) Patent No.: US 8,648,844 B2
(45) Date of Patent: Feb. 11, 2014

(54) POWER SAVING TRANSMISSIVE DISPLAY

(75) Inventor: Mark Jozef Willem Mertens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 328 days.

(21) Appl. No.: 12/742,958

(22) PCT Filed: Nov. 13, 2008

(86) PCT No.: PCT/IB2008/054760

§ 371 (c)(1), (2), (4) Date: May 14, 2010

(87) PCT Pub. No.: WO2009/066210

PCT Pub. Date: May 28, 2009

(65) Prior Publication Data

US 2010/0245330 A1 Sep. 30, 2010

(30) Foreign Application Priority Data

Nov. 20, 2007 (EP) ..................................... 07121063

(51) Int. Cl.
*G06F 3/038* (2013.01)
*G09G 3/36* (2006.01)

(52) U.S. Cl.
USPC .............. 345/211; 345/212; 345/104; 345/87

(58) Field of Classification Search
USPC ................. 345/204–215, 87–104; 348/42–60
See application file for complete search history.

(56) References Cited

U.S. PATENT DOCUMENTS

| | | | | |
|---|---|---|---|---|
| 4,456,347 | A | 6/1984 | Stahly | |
| 7,415,191 | B2 * | 8/2008 | Sako et al. | 386/248 |
| 2005/0057552 | A1 | 3/2005 | Foo et al. | |
| 2005/0071698 | A1 * | 3/2005 | Kangas | 713/300 |
| 2005/0198661 | A1 * | 9/2005 | Collins et al. | 725/19 |
| 2005/0238195 | A1 | 10/2005 | Wei | |
| 2006/0187158 | A1 | 8/2006 | Wakabayashi et al. | |
| 2009/0110274 | A1 * | 4/2009 | Atanassov et al. | 382/169 |

FOREIGN PATENT DOCUMENTS

| | | | |
|---|---|---|---|
| CN | 1878253 | A | 12/2006 |
| JP | 2001333030 | A | 11/2001 |
| JP | 2003174505 | A | 6/2003 |
| JP | 2006129262 | A | 5/2006 |
| JP | 2007036874 | A | 2/2007 |
| JP | 2007049693 | A | 2/2007 |
| JP | 2007158787 | A | 6/2007 |
| WO | 2005062608 | A2 | 7/2005 |
| WO | 2006111797 | A1 | 10/2006 |

OTHER PUBLICATIONS

Phillips, Phillips Consumer Electronics News Center, "Phillips Introduces Active Ambilight ambient lighting technology," www.press.ce.philips.com, Sep. 2004.*

(Continued)

*Primary Examiner* — Ilana Spar

(57) ABSTRACT

For reduced power wastage, a transmissive display (100), comprises a backlight (106) and a valve (110) for modulating light from the backlight to create an image, and furthermore the transmissive display comprises: a connector (198) for connection with a connected viewer behavior detection means ((150, 152, 165), 160), and a power optimizer (120), having an input connection (C_i) to the viewer behavior detection means for receiving from it a behavior measuring signal (I_usr), and having an output (O_BL) for sending an optimal drive value (D_Lb) to the backlight (106) depending on the behavior measuring signal (I_usr).

6 Claims, 4 Drawing Sheets

(56) References Cited

OTHER PUBLICATIONS

Iranli et al: "HEBS: Histogram Equalization for Backliight Scaling"; Proceedings of the Design, Automation and Test in Euro0pe Conference and Exhibition (Mar. 2005) IEEE, 346-351.

Takemura et al: "What You Look At Is What You Control: A Universal Remote Control Based on Gaze Measurement Technology"; First IEEE Technical Exhibition Based Conference on Robotics and Automation, 2004, pp. 101-102.

Meehan: "Are You Looking At Me?"; A Thesis Submitted to the University of Dublin, Trinity College, May 2006, 76 Page Document.

* cited by examiner

POWER SAVING TRANSMISSIVE DISPLAY

FIELD OF THE INVENTION

The invention relates to a new type of power saving transmission display and a method of driving it.

BACKGROUND OF THE INVENTION

With a growing amount of people on the planet, and an increased awareness of the ecological damaging potential of those people, it is important to make eco-friendly electrical apparatuses, since there are coming evermore electrical apparatuses on the market (e.g. electrical toothbrush instead of manual brush; a single internet query costing as much power as an hour light from an eco light bulb). There is an important, to be continued, trend to at least make those apparatuses as energy-friendly as possible.

For televisions, this has led to the consideration that a television may be switched off dependent on some criterion (e.g. the passage of time), automatically (this could be seen as a kind of advanced user interface/remote control/on-off button, if it were to be dependent on some user behaviour).

However, whatever interactive switch one may come up with—irrespective of the cost—fact remains that some or many people may not want to switch the t.v. off. The inventor posed the question: "If one sees those people reading a book, and the television remains playing, are these people really so lazy to even after half an hour not get up and switch the t.v. off, or do they knowingly choose to have the t.v. on, e.g. a single person, to have a cozy atmosphere?"

Such an automatically off-switching apparatus would hence not be one according to the desire of its (potential) owner, so there would be a need for something else, extra, in the market.

SUMMARY OF THE INVENTION

Having such considerations in mind, elements of the present invented technologies may comprise inter alia:

A transmissive display (100), comprising a backlight (106) and a valve (110) for modulating light from the backlight to create an image, characterized in that the transmissive display comprises:

a connector (198) for connection with a connected viewer behaviour detection means ((150, 152, 165), 160), and a power optimizer (120), having an input connection (C_i) to the viewer behaviour detection means for receiving from it a behaviour measuring signal (I_usr), and having an output (O_BL) for sending an optimal drive value (D_Lb) to the backlight (106) depending on the behaviour measuring signal (I_usr).

On this display, the viewer can still see a reasonable quality picture—e.g. if he looks at it to check what's currently on every 5 minutes, while simultaneously reading a book, talking to someone, or doing the dishes—yet there may be a considerable saving of the power used. This novel system then needs the following two elements.

Firstly, there is a detection means or system (comprising detectors and a analysis processor for analyzing the data from the detectors and converting them in a mathematical model usable by the power optimization strategy), which allows the identification of what the user his doing. E.g. on the basis of a particular detector embodiment being a camera 160, the analysis processor may be able to check if a person is looking at the display, and how often (i.e. is he continuously watching, or just now and then, doing other activities for the majority of the time). The detectors will typically be physically attached to the display, but the connector 198 may also be e.g. a wireless link to a camera prefixed in a corner of the room, e.g. a security camera (in this case eye orientation estimation—see below—must take into account changed perspective). The analysis processor will typically be a central processor in the display (e.g. the one in which the power optimizer is already comprised), however it may also belong to the intelligent sensor (e.g. the camera connected to a laptop, doing an analysis of the user's movements through the room, and sending the mathematical model codes for that to the display via the connector 198.

The mathematical model may be as simple as a binary indicator ("watching the program=1"; "not watching=0"), or it may be a more complex nominal (classes), ordinal, or ratio numerical code for different types of behavior, e.g.: ("user viewing continuously=1"; "user viewing 50% of the time=2"; "user viewing sporadically=2") or ("user sitting on the bench right in front of t.v. [distance 10 cm up to 2.5 metres]=1"; "user active further in the room [distance 2.5 metres up to 6 metres]=2"; "user in another room [left the room]=3"), etc.

Secondly, given that the behavior of the user is thus classified via the detectors measuring physical parameters reflecting what he is doing, the mathematical code is used to control the display (i.e. the backlight, and in some embodiments also the drive values for the valves) optimally, so that still a reasonably visible picture is shown (though not at the maximally attainable quality anymore), but at reduced power.

There are several options to balance the power versus visibility, either by focusing mostly on the used power, and then optimizing the visibility (which can then become low, but still usable), or by constraining a minimally required visibility to obtain the maximally achievable power reduction (this can be useful for the elderly, or if the task at hand is not to have just a pleasing, moving picture in the background, but a more critical task, e.g. watching your children's room; the user may configure which power saving mode he desired [e.g. "background atmosphere==1"; "instant recognition of the picture/text required==2"; . . . ], and hence how much the power can be reduced at the cost of visibility, by inputting this via a user interface 170, e.g. a dedicated button on the remote control), or by optimizing the both simultaneously.

For the watching/not watching scenario, the power control can be as simple as to (according to a preset strategy in the display) halve the driving value D_Lb for the backlight (if picture content and room illumination still give a viewable image), although in general a more complex optimization strategy will be desirable, taking into account (as far as system cost allows) such factors as: dimmable range of the backlight, dynamic range of the valve, surrounding scene colors and room illumination, amount of reflection on the front of the display, size of the structures in the displayed image—or more general object content of the image-, distance of the viewer, activity of the viewer, attention level of the viewer, time of day, type of content currently shown (a sports video or a text page), etc.

Lastly it should be said that there can be several scenarios for the speed of the process of changing the backlight/video parameters (also dependent on how often a user watches, or the particular algorithm used to determine how he is watching). E.g., one could have a slow mode which ignores that a user is looking e.g. 3 minutes to the display more attentively (something may have captured his interest) while classified as having an activity with friends, which means that the output luminance of the display and the backlight power stay low, or in a fast mode the display could reset its backlight luminance to high "immediately", e.g. if one of the viewers watches more than 15 seconds. These modes may be set via the user interface 170, or may be estimated by the pre-included algorithm in the display.

It is useful like in some embodiments, if one saves on backlight power with a certain amount, that the power optimizer also calculates more optimal driving values I_out for the valves, to create a more visible displayed output image than if one only changes the backlight and presents the input image to the valves (e.g. if the picture is rather dark in content, one can reproduce this by lowering the backlight, yet driving the valves to their maximal range). This corresponds to an image enhancement operation T on the input image im. In simple models the I_out is a single range (e.g. [0,255]) irrespective of the valve the signal is sent to (e.g. if pixel valve (0,10) and (10,10) both have a signal 240 in the range, they both transmit the same amount of light), however in the more complex scene/segmentation-dependent variants, I_out should be seen as a picture, i.e. I_out (x,y) has a particular value for each valve pixel (x,y), i.e. one could e.g. make the centre of the displayed image somewhat brighter compared to the input picture.

BRIEF DESCRIPTION OF THE DRAWINGS

These and other aspects of or relating to the invention will be further elucidated and described with reference to the drawing, in which.

DETAILED DESCRIPTION OF EMBODIMENTS

Figure 1:
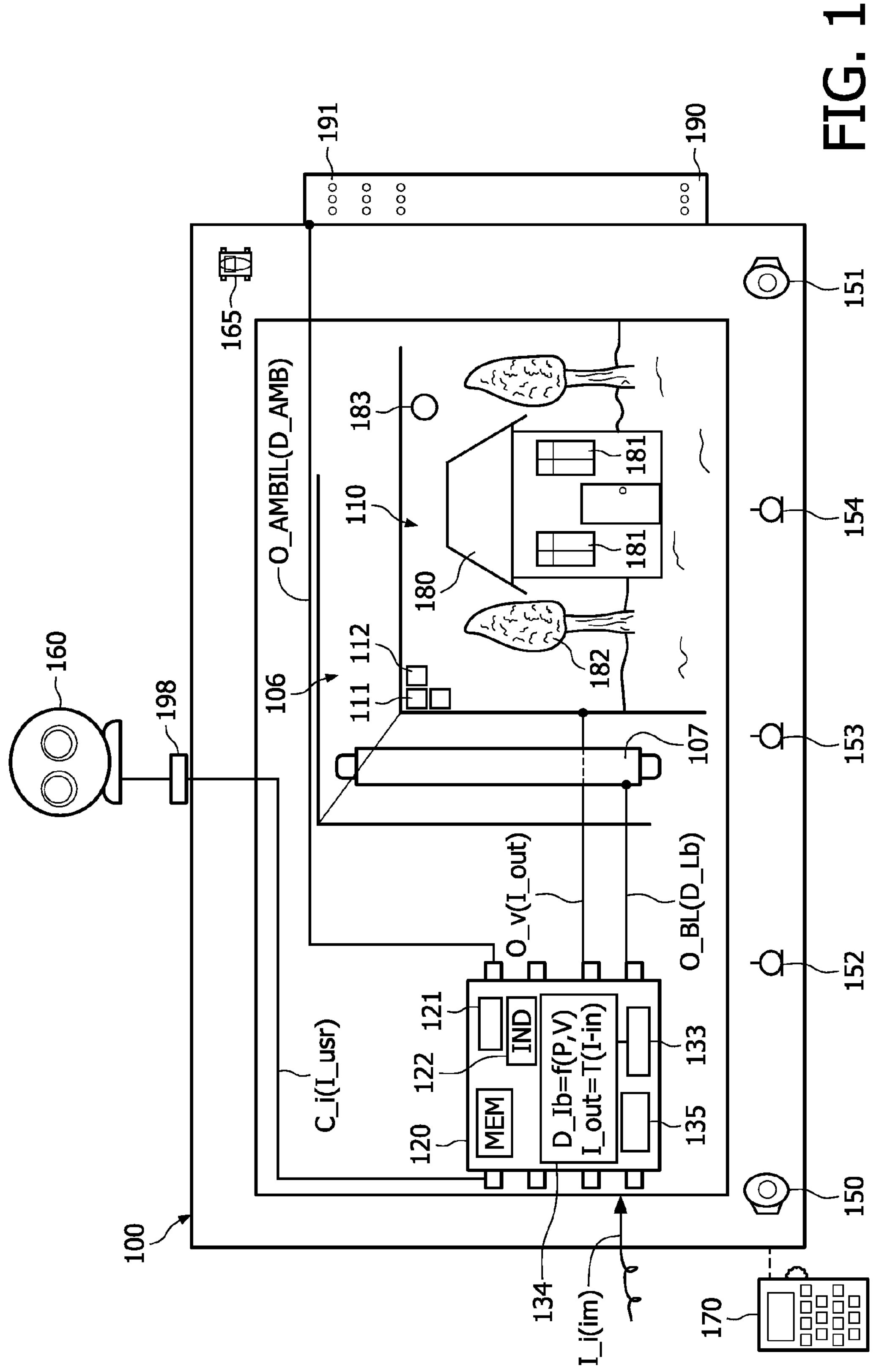
FIG. 1 schematically shows an exemplary embodiment of a particular LCD transmissive display with a couple of alternative viewer behaviour detection means coupled.

FIG. 1 shows an LCD-based television, with an exploded view on the backlight module 106 (a TL tube 107 of it is shown, but this could also be a LED e.g.), with in front of it the LCD valve 110, with pixels 111, 112, . . . which under control of an appropriate voltage to their transistor via drivers (not shown) transmit a certain percentage of the backlight light at that location, forming an image as exemplary shown.

The skilled reader will understand that the transmissive display 100 is not limited to this type of display (neither hardware construction, nor size or application domain), e.g. it could be a front projector with dimmable illumination for a meeting room, a commercial display booth, or a laptop pc display (which the user has e.g. in the train on the table before him for browsing internet, while simultaneously in discussion with a person next to him). The skilled reader will understand that the word "valve" means generically any physical structure which allows to locally pass a signal-controllable amount of light from the backlight falling on it (e.g. supplying a drive signal=0 will make it shut, i.e. transmit approximately no light, whereas drive value 255 makes it approximately fully (100%) transmissive). A popular such means is the liquid crystal, which under control of a voltage changes its internal structure, interfering with the light, which makes less or more light come out in a particular direction, however, other display types exist, e.g. bubbles which release an controlled amount of absorbing dye.

Also shown are a number of possible viewer behaviour detection means, of which only one needs to be present (read connectable in the system to the display) to make the invented system work.

E.g., a thermal (around 10 micron) infrared detector 165 may be present to detect whether a user is present, and preferably in the right position (on the bench). This only detects user presence, not yet head/eye/gaze direction, but would work for certain applications. E.g. the system may be precalibrated to detect the room without the viewer, and then with the heat of a viewer sitting on the bench. A more advanced detector capable of thermal imaging may also look at the size of the viewer etc.

Several more complicated systems to check viewer position and motion around the display may be incorporated, e.g. depending on disturbance of a surrounding field (electrical, optical, ultrasound, . . . ). The example shown has at least one ultrasound emitter 150 and at least one (but there may be several optimally configured ones) receiver 152. The reflected pulses give an indication of whether the structure in front has appropriately changed. E.g. in a time-of-flight analysis, the user will sit closer than the back of the bench, and also his movement may be detected.

In the following we will however in detail describe a relatively cheap and simple, yet robust system using an attached camera 160 (e.g. in the middle on top of the display). A stereo camera is shown (which allows more versatility regarding e.g. distance estimation), although a normal camera would do (RGB, and possibly also with a fourth near infrared sensor which can aid in facial detection).

With aid of FIG. 4 below, it will be described how such a camera can be used for a very useful embodiment with gaze direction estimation, however, we first describe how the power saving works, assuming that we have an indication like "user present (sitting on the bench in front of the t.v.)" or "user looking in the direction of the displayed images, i.e. watching". For explanation simplicity, we will mostly describe a relatively simple to implement method, and then shortly elaborate on the more complicated possibilities.

Figure 2:
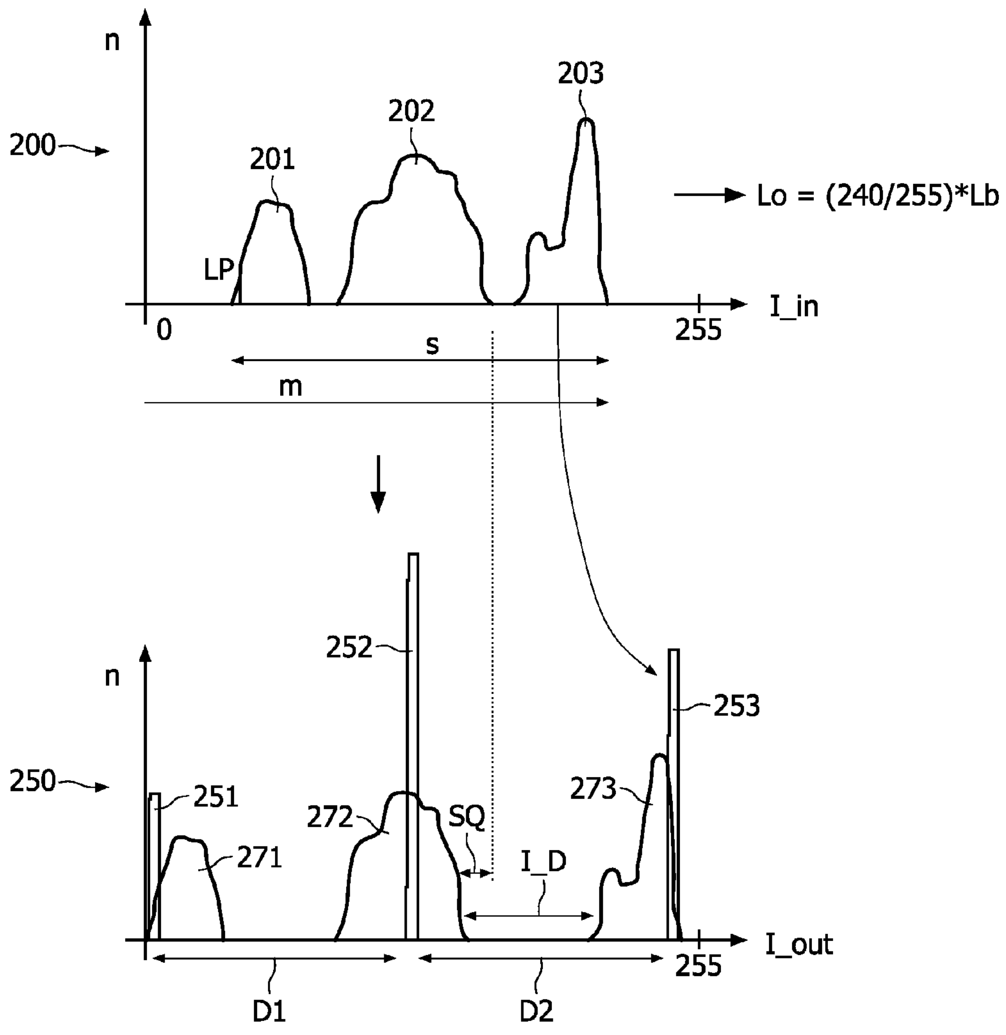
FIG. 2 schematically shows how an exemplary transformation T of the power optimizer can map grey values of an input image to drive values I_out for the valves giving a more visible displayed image.

FIG. 2 shows the histogram 200 of the "house" picture displayed in FIG. 1 as derived from an input image signal im (the grey values—color is ignored for simplicity, although the below mapping can take into account the color also, to give e.g. dark saturated colors a somewhat higher luminance, so that they look more brilliant; in the below we will use grey value and color interchangeable, the skilled person understanding when it is mostly about the luminance or grey value of a colored pixel), the input image comprising grey values I_in intended for display (i.e. controlling the valves if the invention is not applied) with values between 0 and 255, and the count n of the amount of pixels in the image having a particular value. Because of the multiplicative physics of the valve, if a local backlight unit generates Lb lumen and the local pixel is controlled with drive value I_out (e.g. equal to I_in) 240, then the locally outcoming light from the display pixel is Lo=(244/255)*Lb.

An input picture may comprise a lesser span of grey values than the total range [0,255] or often also comprise values equal to 255, which often indicates that a scene of too high dynamic range was captured (e.g. the sun 183 may be clipped; so it's color not being realistic anyway, one has much freedom in reallocating it, e.g. one could treat all colors close to 255 in the same way, allocating them to 255, and using the remaining [0-254] for optimally distributing the other object colors, which is reclipping).

In the example, the first histogram lobe 201 comprises the colors of the house 180—except for the bright windows 181, which correspond to lobe 203, which has a second mode/bump for the sky pixels—and the plants (grass and trees) fall in the intermediate ranged lobe 202.

A first interesting measure is the input image maximum (m) (say e.g. equal to 235). One can already scale down the backlight with a ratio 235/255 while simultaneously multiplying the I_in values with the inverse ratio (i.e. the maximum drive value then becomes 255), while retaining exactly the same displayed output image look (i.e. without even changing the visibility of the displayed picture). However, looking at the span (s), one realizes that one can do further backlight dimming. Firstly, if one has multiplied the three lobes of histogram 200 with 255/235 to obtain the modified drive values I_out, one can dim the backlight further depending on a lower limit of lobe 201 (e.g. the 10% percentile demarcation LP), namely, until the output luminance L=LP*Lb (Lb being the dimmed backlight level) is about equal to a typical room front plate reflection (a surround light sensor may be included in the system, and further considerations may be used to modify this value, e.g. the amount or size of objects in which the values below LP occur, etc.).

However, secondly, a reduced span, and also the distances between the typical histogram lobes create opportunities to do much better modifications visibility-wise, and where there is insufficient interlobe distance, the power optimizer can increase it by changing the input image.

Figure 3:
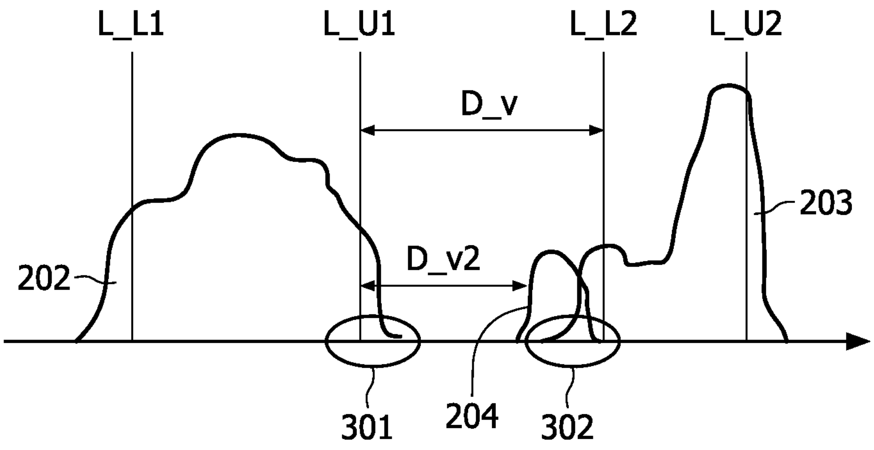
FIG. 3 schematically shows an exemplary manner to measure the visibility of a displayable picture.

Simple algorithms of the power optimizer do histogram analysis do find typical lobes in the histograms (used in the simplified description below), although the better quality algorithms will also look at spatial properties of the similar colors, and do a geometrical image segmentation. E.g., lobe 203 consists of pixels both of the sky and the two windows, but having this knowledge, it is easy to find the isolated region of a separate window (schematically shown with lobe 204 in FIG. 3). There are several methods to be found in prior art for histogram decomposition, e.g. one can first look for maxima, and then see how deep the slopes go on either side (e.g. one can look at the correlation with a smooth, simple function, like a Gaussian). Oftentimes, when applied on this coarse level, the so obtained lobes give already a good description of the image composition (e.g. sky is typically much brighter than the ground), however, since the goal is to improve the visibility, meaningful object segmentation is not absolutely necessary (in particular, it is acceptable if the trees are merged with the grass in one object, since if they have similar colors, the power optimizer would apply a similar transformation to them, which renders them more visible, compared to the surroundings of the display and/or the other colors in the picture (we will first describe the situation where the surroundings are less relevant, and visibility can be determined with the image (im) content alone—e.g. the television is typically much brighter than the surround—, although when the ambilight is on, the more reliable visibility models should take viewer adaptation to illuminated surrounds also into account when estimating the visibility of the image, which is to be optimized versus power usage).

Having obtained from the decomposition algorithm a number of histogram lobes, the goal of the power optimizer (if it doesn't just change the backlight level: D_lb=f(P,V) a function of calculated output power-being dependent mostly on the backlight drive value—and estimated visibility, but wants to use the additional freedom of image enhancement I_out=T (I_in) to generate optimized valve drive signals for improved visibility and/or further lowered power usage) is to optimally reposition those modes. E.g., the power optimizer could posterize all values in lobe 203 in a single (or very few) value(s), obtaining modified histogram lobe 253. Such extreme measure (distances D1 and D2 optimized) is needed only under very severe circumstances. In general, there will be several different luminances still discernable within a lobe, so it would seem better to just move the lobe away from other lobes, and leave the internal lobe shape.

However, this could lead to a situation that the colors within the range 301 (indicated with the ellipse) are too similar to the colors of range 302, i.e. they cannot be discerned under the present backlight conditions etc. from where the user is sitting, or at the most if he is really looking attentively (which may be undesirable for certain tasks, e.g. if he is reading some colored graphic text [text can easily be detected and segmented with a text detector] and the colors of text and background fall in those ranges, and the backlighting is really low, a binary posterization into lobes 251 and 253 would be desirable). This situation often happens, if e.g. one has a shadow on say a round object like an apple, when on one side the apple is light and easily discernable from the dark background, yet on the other one can not see the apple's edge.

So, a simple algorithm for the power optimizer to perform a better visibility/power balancing is the following.

Demarcation boundaries for the adjacent lobes are determined by the power optimizer (see FIG. 3), e.g. 5% all pixels of lobe 202 are contained below the lower limit L_L 1 and 5% above upper limit L_U 1 (this 5% may either be preset in the algorithm in factory as an amount of error, colors which at the worst may become badly visible and/or undiscernable from neighbouring objects, however, more complex algorithms which benefit from object segmentation and analysis may determine this criterion per image, e.g. if the 5% upper pixels are near the boundary of the assumed/segmented object the boundary is better set to 0% (i.e. the upper end of the lobe), whereas if they are a small patch in the centre of the object—likely an illumination reflection highlight—they may be discarded from the optimization indeed).

The distance D_v between the upper limit L_U 1 of a first lobe 202 and the lower limit L_L 2 of a second lobe 203 will then be a parameter in the visibility estimation (visibility estimation unit 133 is typically another software program encoding the psychology of human vision given the display hardware constraints, to run on the processor which the power optimizer 120 will typically be, giving input for, or typically being called several times by a drive value calculation unit 134, which does the actual power optimization, although the skilled person given the presented novel teachings will find no problems beyond mere programming or IC design to realize this as different software or hardware configurations, and will also recognize the described in an actual situation). In case the power optimizer is able to segment images with image segmentation unit 135, there will be more distances (D_v 2) and also more freedom to intelligently optimize.

These are variable parameters, which the power optimizer can tune, since it can both shift lobes, leading to variable interlobe distances I_D, or modify the lobe shape, e.g. compressing it, leading to additional distances SQ (the amounts of lobe shape changeable by the algorithm will in the simpler, "blind" versions typically depend on such factors as the range of grey values in a lobe, and the amount of pixels in the lobe (an importance correlate; e.g. a small window may be easily posterized into a single value), whereas more advanced image analysis methods may further take into account that e.g. more central objects, or faces, should have lesser modified lobe shapes than other lobes). The latter will in the simple embodiments be done blindly, leading to some discoloration of object pixels, but making them more different from the surround, increasing their contrast. However, if object segmentation is done, the algorithm may e.g. isolate near object boundary shadow gradients, and identifying them with an extremity of the lobe, modify only that part—say 301—of the lobe shape parametrically (i.e. e.g. making the gradient less contrasty, only 2 allowable grey values, which results in a more plain apple, looking less 3D, but more contrasted to its surround, i.e. better visible).

A simple model of visibility (although more complex models may use the structure of surrounding color patches, the size of segmented objects, etc.) just treats all colors as (relatively large) patch colors. Then psychovisual research has shown that the grey values equal to or below L_U 1 are discernable from those equal to or above L_L 2, if there is at least one "just noticeable distance" (JND) luminance difference. This JND is dependent on several factors, such as display and image object size, total luminance, viewer adaptation, etc., but as a simple approximation it may be said that it is 2% of the lower luminance L_U 1.

In optimizations focussing on the least achievable amount of power while still retaining some visibility, the power optimizer may recalculate the lobes so that their limits are apart at least a factory preset amount of JNDs, e.g. 3 JNDs. For overlapping lobes, this may involve excessive lobe shape compression, for some objects possibly even resulting in single value posterization.

In optimizations focusing on visibility (yet reducing some power usage) the viewer may e.g. increase with his remote control the amount of required JNDs. This may be useful for the elderly, but also e.g. if the visibility was misestimated because the viewers are playing cards under a strong lamp.

Also, some embodiments will change the parameters (semi)automatically depending on the distance of the viewer—in which case a manual input in the optimization may be valuable—, e.g. on the basis of the hypothesis that a distant viewer is likely less interested in anything but a changing global pattern (almost like a flickering light bulb), or on the contrary, the objects becoming smaller, and picture detail getting lost already for resolution reasons, that those objects are better posterized, or at least represented by only few internal values, but allowing the lobes to be maximally separated.

Figure 4:
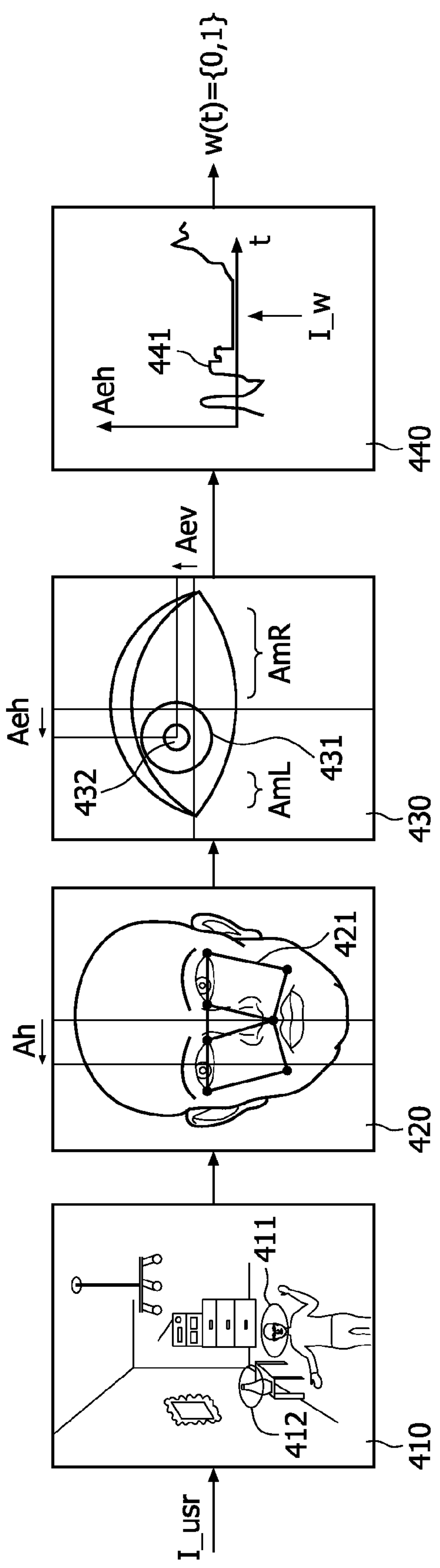
FIG. 4 shows an exemplary gaze direction estimation unit (typically but not necessarily composed of software components).

FIG. 4 shows more information on how to construct an exemplary viewer behaviour detection means, namely one that checks whether the user is watching what is on the display (a television program, his email, etc.), which units will typically reside in the gaze analyzer 121. It is assumed that the gaze analyzer gets via connection C_i a behaviour measuring signal (in general any signal containing sufficient information to roughly estimate some user behavioural aspect) I_usr which is a raw picture from the camera (and not I_usr being e.g. already preprocessed information such as a face orientation angle, which is also possible in some embodiments). First a scene analysis unit extracts faces 411, e.g. on the basis of facial color. A face analysis unit 420, first checks whether a face is detected (and not a face colored vase 412) on the basis of e.g. ellipsoidal shape, but is further arranged to study the face and extract its orientation (angle Ah can be calculated and output to other system modules). This can be done e.g. by looking at the connective network 421 between characteristic face points (eye ends, shadow below nose, . . . ), and studying its perspective shrink.

Having the eyes extracted, an eye analysis unit 430 is arranged to analyze the eye, and in particular its gaze direction. This can be done by detecting circular arcs 431 between light and dark regions and estimating the centre points of the pupils 432, resulting in at least a horizontal angle Aeh, and possibly also a vertical one (both between a negative and positive maximum, zero being straight on). Other measurements can be used in the determination (alternatively or to increase accuracy), like e.g. the amount of eye white on either side of the iris (AmL, AmR). Furthermore, the eye analysis unit 430 is arranged to calculate from the angles Aeh, Aev whether one is looking towards the display, by taking into account e.g. such factors as geometry of the display, camera, and room (a precalibration face where the user lets the system measure several watching/not watching eye positions is also possible, leading to class boundaries in eye angle space, and possibly related probabilities).

Finally, this at least horizontal eye angle data may be input (note that this unit is optional, and also the other units are mere possible enabling examples, but can be built differently) for a temporal statistics unit 440. The person may be classified as watching at a certain time instant (W(t)=1) if during a long enough time interval I_w (e.g. 2 seconds) the angle Aeh is near zero (at least small enough that the eye falls somewhere well in the display; near the centre).

Also, in the more advanced systems, a viewer activity classification unit may be present (e.g. in a remote pc, running an intelligent home system already, coupled to the camera, or in the power optimizer), which extracts some indicator of the user's behaviour (e.g. "IND=passive=1"; the user may have fallen asleep, "IND=running around=2"=he is running actively through the room and most likely engaged in other activities that scarcely allow him to watch, etc.). This can be done e.g. on a motion pattern analysis of human objects extracted from the camera pictures, but several other algorithms are possible (e.g. classifying the amount of time certain 3D positions in the room are covered, specific recognized gestures, etc.).

Lastly, recently televisions (and this will evolve to other types of displaying apparatus) have emerged which allow a closer immersion in the content (the image or at least some environmental feel/suggestion of it is kind of enlarged into the room), comprising a lighting unit 191 arranged to illuminate a spatial surrounding of the transmissive display, so-called ambilight displays.

One could just have the ambilight co-evolve with the presented picture as known, but the present invention allows to control the ambilight more optimally, with a separate algorithm. The balancing now comprises three criteria:

amount of power spent by the ambilight. One may think that one could just switch off the ambilight if the user doesn't watch, to save on power at least for those lights, but on the contrary, if the user has switched the television in the "ambience mode", and is using it only as an atmosphere provider, and not closely watching to be able to see the detailed picture information anyway, the ambilight may have higher importance. The user will have typically a number of selectable settings, from using the entire t.v. (picture)+ambilight system as a kind of variable lamp, to on the other end of the scale a scenario where the content is more important, and needs to be clearly visible. The power to the ambilight will also depend on such factors as size of the illuminated field and how much spatial variation it can introduce (single TL tube versus several LED modules 191).

The "visibility" of the ambilight becomes a new criterion: how important is it compared to the picture, e.g. depending on the above setting, to paint an entire wall in an atmospheric yellow (here the ambilight may be set to lower temporal variation than the video signal), enough ambilight needs to be produced.

The visibility of the picture, which will depend inter alia on how reflective (white) the surrounding objects/walls are for the ambilight. At least in the setting where the t.v. image content is dominant and should be very visible, one should not come to a situation which (to state the extreme variant) the ambilight is a bright ring around essentially an image which to the viewer looks all black. In these scenarios the image content may need to be boosted, but more importantly possibly the ambilight constrained to an upper limit (e.g. whatever the normal ambilight algorithm e.g. by integrating image content gives as a driving value, the final driving value should be clipped so that the surrounding luminance is below 10% of the average picture luminance; this will typically assume in the in factory setting white walls, although the consumer may have an option for at home calibration). The visibility estimate in this case may be inspired e.g. on the Hunt formulae, taking into account such factors as size and position of image and surround patches, etc.

Output is at least one optimal ambilight drive value D_AMB over connection O_AMBIL.

The algorithmic components disclosed in this text may in practice be (entirely or in part) realized as hardware (e.g. parts of an application specific IC) or as software running on a special digital signal processor, or a generic processor, etc.

It should be understandable to the skilled person from our presentation which components can be optional improvements and be realized in combination with other components, and how (optional) steps of methods correspond to respective means of apparatuses, and vice versa, and hereby we disclose these combinations at least implicitly. Apparatus in this application is used in the broadest sense presented in the dictionary, namely a group of means allowing the realization of a particular objective, and can hence e.g. be (a small part of) an IC, or a dedicated appliance, or part of a networked system, etc.

Some of the steps required for the working of the method may be already present in the functionality of the processor instead of described in a computer program product, such as data input and output steps.

It should be noted that the above-mentioned embodiments illustrate rather than limit the invention. Where the skilled person can easily realize a mapping of the presented examples to other regions of the claims, we have for conciseness not in-depth mentioned all these options. Apart from combinations of elements of the invention as combined in the claims, other combinations of the elements are possible. Any combination of elements can be realized in a single dedicated element.

Any reference sign between parentheses in the claim is not intended for limiting the claim. The word “comprising” does not exclude the presence of elements or aspects not listed in a claim. The word “a” or “an” preceding an element does not exclude the presence of a plurality of such elements.

The invention claimed is:

1. A transmissive display, comprising:

a backlight;

a valve for modulating light from the backlight to create an image;

a connector for connection with a viewer behaviour detection apparatus for obtaining a behaviour measuring signal (I_usr); and a power optimizer, having (a)(i) an input connection (C_i) coupled via the connector to the viewer behaviour detection apparatus for receiving from it the behaviour measuring signal (I_usr), and having (a)(ii) an output (O_BL) for sending an optimal drive value (D_Lb) to the backlight depending on the behaviour measuring signal (I_usr) such that b(i) power to the backlight remains ON and (b)(ii) a reasonable quality viewable image is still shown on the display via the valve, wherein the power optimizer further calculates the optimal drive value (D_Lb) based on a function f(P,V) that is (c)(i) dependent on a power (P) used by the display when the backlight is driven by the optimal drive value (D_Lb), and (c)(ii) dependent on an estimated visibility measure (V) that models an estimate of how visible the created image, to be optimized on the display via the valve versus power usage, is to the viewer while still retaining visibility, wherein the power optimizer further calculates a transformation (T) of input drive values (I_in), of an input image (im), into intelligently optimized output drive values I_out for driving pixels of the valve, via an output connection O_v between the power optimizer and the valve, wherein the transformation includes a histogram analysis on the input image to find lobes of a histogram and determination of demarcation boundaries for adjacent lobes, the transformation further including turning variable parameters in the estimated visibility measure by shifting the lobes, leading to variable inter-lobe distances, or by modifying a lobe shape.

2. The transmissive display as claimed in claim 1, wherein the viewer behaviour detection apparatus comprise a camera, and either the camera or the power optimizer comprises a gaze analyzer arranged to determine on the basis of a picture of the camera a gaze direction of the viewer.

3. The transmissive display as claimed in claim 1, wherein the viewer behaviour detection apparatus comprises a detector for detecting a distance of the viewer to the transmissive display, and wherein the power optimizer is further arranged to calculate one of (i) the optimal drive value (D_Lb), (ii) the output drive values (I_out), or (iii) the optimal drive value (D_Lb) and the output drive values (I_out), dependent on the distance of the viewer.

4. The transmissive display as claimed in claim 2, wherein either the camera system or the power optimizer comprise a viewer activity classification unit, and wherein the power optimizer is further arranged to calculate one of (i) the optimal drive value (D_Lb), (ii) the output drive values (I_out), and (iii) the optimal drive value (D_Lb) and the output drive values (I_out), dependent on a number (IND) modelling a particular behaviour of the viewer.

5. The transmissive display as claimed in claim 1, further comprising a lighting unit arranged to illuminate a spatial surrounding of the transmissive display, wherein the power optimizer is further arranged to determine a drive value (D_AMB) for the lighting unit depending on one or more selected from the group consisting of (i) the behaviour measuring signal (I_usr), (ii) the optimal drive value (D_Lb), and (iii) the output drive values (I_out).

6. A method of calculating drive values (D_Lb, (I_out, D_AMB)) for a transmissive display as claimed in claim 1, the method comprising the steps:

obtaining a behaviour measuring signal (I_usr) indicative of behaviour of a potential viewer in a surrounding environment of the transmissive display; and depending on (i) the behaviour measuring signal (I_usr), a calculation of power usage (P) as a function of the drive values, and (ii) a measure of visibility (V) of at least an image (im) to be displayed on the transmissive display (100), calculating optimal values for the drive values (D_Lb, (I_out, D_AMB)) as regards to constrained power usage.

* * * * *